May 29, 1951  J. B. McFALL  2,554,583
MATERIAL FLOW CONTROL MECHANISM
Filed Sept. 9, 1946  2 Sheets-Sheet 1
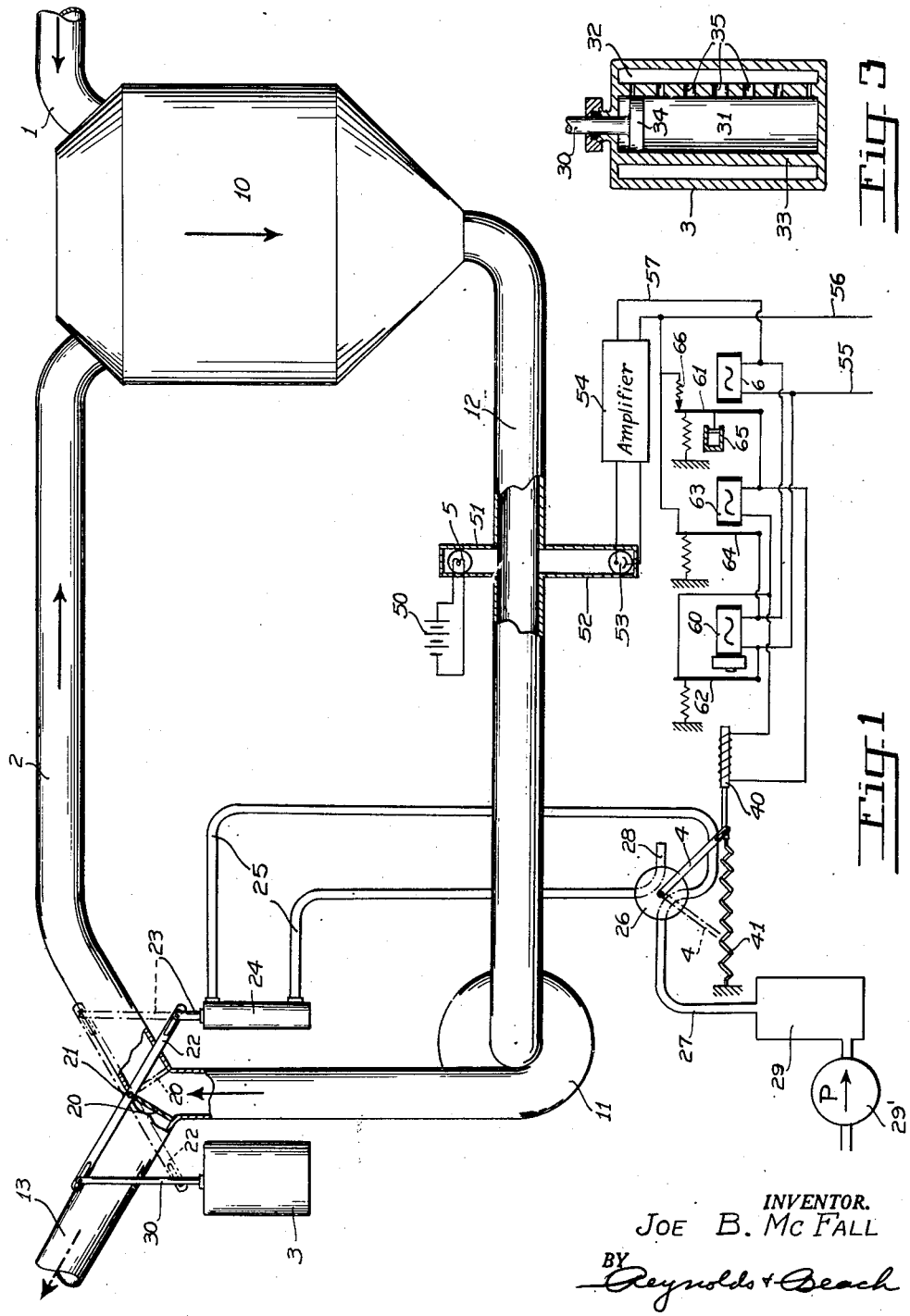
INVENTOR.
JOE B. McFALL
BY Reynolds + Beach
ATTORNEYS

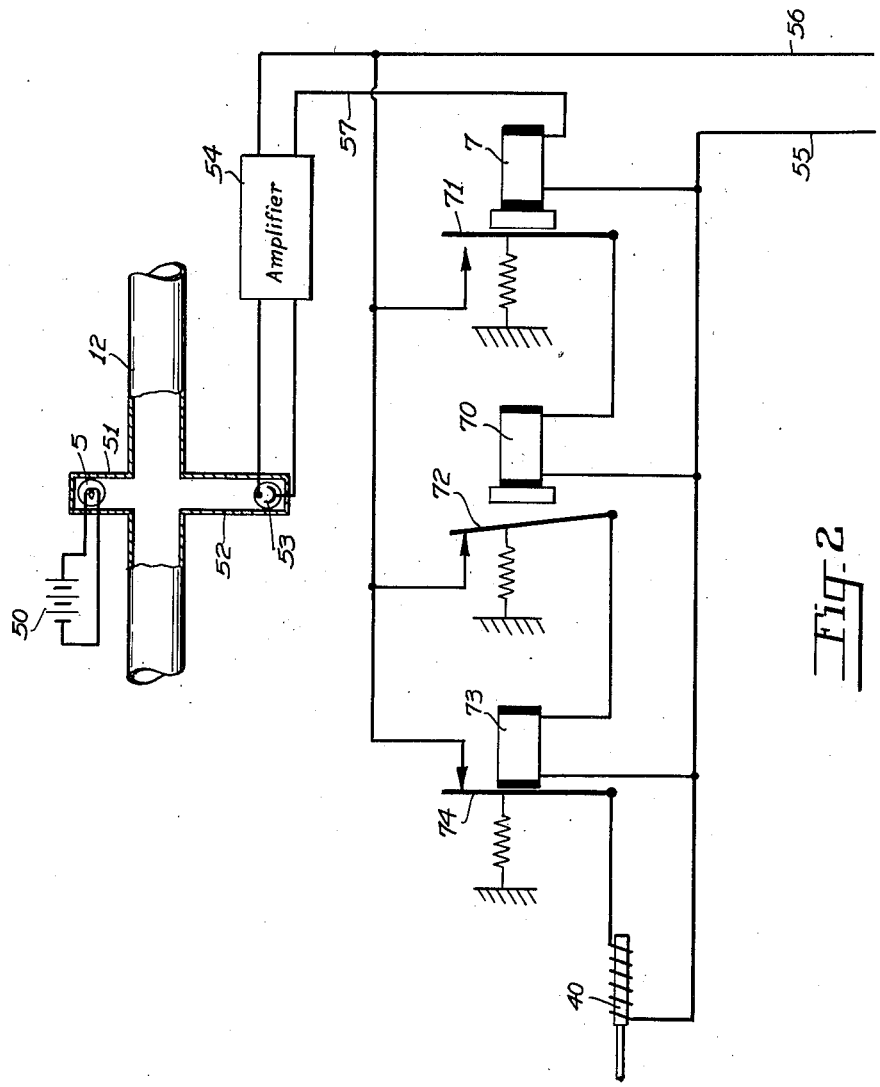

Patented May 29, 1951

2,554,583

UNITED STATES PATENT OFFICE 2,554,583

MATERIAL FLOW CONTROL MECHANISM

Joe Barbee McFall, Seattle, Wash., assignor to United States Plywood Corporation, Seattle, Wash., a corporation of New York Application September 9, 1946, Serial No. 695,708

14 Claims. (Cl. 302—17)

1

My invention pertains to a material handling system, and more particularly to control mechanism for controlling the path traveled by airborne comminuted material passing through a system of distributing conduits. More specifically the invention is useful in controlling the delivery of wood particles, such as sawdust, chips or hogged fuel, to a furnace.

Where mill refuse in the form of wood chips and sawdust is utilized as fuel for the furnaces of a power plant installation incorporating steam boilers, it is customary to convey such fuel to the furnace continuously as it becomes available from operation of the mill. The waste produced by a mill varies, however, depending upon the number and type of machines in operation at any given instant. Consequently the amount of fuel deposited in the furnace varies considerably from moment to moment. At one instant there may be a heavy flow, which may continue for several minutes, and then the flow will subside, so that for a short period there may be little or no fuel passing into the furnace.

If the blower effecting movement of the fuel through the conduit system leading to the furnace continues in operation during the periods of slack fuel supply, an excessive amount of air will be blown into the furnace above the flame, which upsets the most efficient draft conditions. As a result the heating zone of the furnace will be cooled at irregular intervals, so that it is difficult to maintain uniform conditions of combustion within the furnace. This objectionable result could, of course, be avoided by deenergizing, at proper times, the blower which propels the fuel to the furnace. The difficulty with such a plan, however, is that, as a practical matter, the blower can only be controlled manually in this fashion, because it is not known in advance when the supply of fuel from the mill as a whole will increase and when it will decrease, and there would necessarily be considerable lag in stopping the flow of air after the fuel supply had dropped below the desired minimum, and in again picking up fuel deposited along the conduits after the blower had been started again.

It is the principal object of my invention, therefore, to control the passage of airborne material moving through a conduit system, such as wood waste passing to a furnace, quickly and effectively in accordance with fluctuations in the supply of such material. More specifically, the plan of control contemplates diverting the flow of air and airborne material from one conduit to another, depending upon variations in the quantity of fuel passing a selected control point.

2

In effecting such a control operation it is an object of the invention to regulate the control in accordance with the principal flow of material, so that a momentary increase or decrease in the quantity will not alter the operation of the system, while such a change sustained for an appreciable, although brief, period will initiate a flow-controlling operation.

A particular object of the invention is to provide control mechanism which is entirely automatic in operation, yet which is of extremely simple construction and capable of functioning satisfactorily over an extended period without requiring appreciable repairs or maintenance work.

A further advantage of the control system is that, if it should cease to function for any reason, the material distributing system will not become clogged, even though it should continue in operation for a considerable period of time after the control mechanism has become inoperative.

Additional objects and advantages of my invention will be discussed in the following description of the typical installation of my control apparatus which is shown in the drawings.

Figure 1 is a diagrammatic representation of a conduit system incorporating my flow control mechanism, which is also illustrated diagrammatically. Fig. 2 shows an alternate circuit. Figure 3 is a central longitudinal section through a hydraulic dashpot unit forming part of the control mechanism.

The conduit system to which my control mechanism is shown as being applied includes a supply conduit 1 through which material is supplied to the handling system, being connected to the upper portion of a hopper 10. A blower 11 draws from the bottom of this hopper into the feed conduit 12 of the discharge and recirculating system, which conduit is connected to the bottom of the hopper, material deposited in the hopper by the supply conduit. The feed conduit is in effect a continuation of the supply conduit, and in the event the hopper is very small or is dispensed with entirely the feed conduit will in fact be an extension of the supply conduit. After passing the blower the material is forced by it into and through the delivery conduit 13 in normal operation. A typical use for such a materal handling system is for collecting all the sawdust and chips from a plywood plant, a lumber mill, or other woodworking factory, and conveying them to a furnace, to which conduit 13 is connected, using such material as fuel for generating steam. In conventional systems of this general type the blower operates continuously, and unless there is a substantially constant deposit of the wood waste in the hopper 10 the delivery of such material through the feed conduit 12 and delivery conduit 13 will fluctuate considerably, while the air discharged by the blower will be substantially constant in volume. Actually the wood waste supply usually cannot be maintained uniform, with the result that the combustion conditions in the furnace will be erratic since the combustion zone of the furnace will be cooled excessively while the flow of fuel is light.

The principal purpose of my control system is to effect delivery of airborne material through conduit 13 only when the quantity available is sufficient to maintain a desired minimum material delivery rate. This result is accomplished, however, while the blower 11 is maintained in operation continuously. Such operation is made possible by connecting to the delivery duct 13 a return conduit 2, communicating with the input end of the feed conduit 12 by way of the hopper 10, to the upper end of which it is connected. Flow of material from the blower 11 then may be diverted from the delivery conduit into the return conduit by a gate 20, which may be supported by a pivot 21 at the junction of the delivery pipe and the return pipe. These conduits preferably diverge from the blower discharge end of the feed conduit 12, and the gate pivot is located relative to their junction so that the gate may be swung between its broken line position illustrated, blocking the return conduit, and the solid line position shown, in which it blocks the delivery conduit.

Preferably the relationship of each conduit 2 and 13 to the feed duct 12 incorporating the blower, as shown, is such that the gate forms generally a continuation of the wall of the feed conduit not obstructed by the gate. A smooth flow of the air and the material carried by it from the blower into the proper conduit is thus assured irrespective of the position in which the gate 20 is disposed. Control movement of the gate between its solid line and broken line positions may be accomplished by a lever 22, which can be swung by suitable power mechanism. The operator shown, for example, is a piston rod 23 reciprocable in a cylinder 24 by a fluid-operated piston. The speed of movement of the gate between its two extreme positions may be limited by a hydraulic dashpot 3 connected by a rod 30 to the end of lever 22 opposite that to which operating mechanism is connected.

The structural details of the dashpot 3 are shown in Fig. 3 as including a casing filled with liquid, which is divided into an inner chamber 31 and an outer chamber 32 by a partition wall 33. A plunger 34, carried by rod 30, slides in the inner chamber against the resistance of the liquid in it. Obviously an escape passage must be provided for the liquid ahead of the plunger in whichever direction it is moving. This may be provided merely by making the plunger somewhat smaller than the chamber through which it moves, but such a construction would afford a uniform resistance to its movement throughout its entire stroke. Actually it is preferred that such resistance be greatest at opposite ends of its stroke and least during its movement through the central portion of its stroke, to snub, and finally to stop, the plunger at opposite ends of its stroke.

This operation is produced by forming in the partition 33 a series of ports 35, those toward each end of the cylinder 3 being progressively smaller than the ports toward the center. As the plunger moves from one end of its chamber 31 to the other, therefore, the liquid will be forced through the ports in the portion of such chamber ahead of it into the outer chamber 32, and through the ports behind the plunger back into the end of chamber 31 out of which the plunger is moving. As the plunger passes the center of its stroke, it closes ports 35 ahead of it in succession. Since not only the number, but the size, of the ports toward which the plunger moves beyond the center of the chamber decrease progressively, the movement of the plunger is gradually retarded.

When the plunger has moved sufficiently far to close the last port 35 in the end of partition 33 toward which the plunger is moving, the remaining liquid ahead of it will be trapped in such end of chamber 31 to interrupt the movement of the piston. Despite force exerted by the power mechanism on lever 22, therefore, the effect of the dashpot 3 is both to retard progressively movement of the lever as the damper approaches one or the other of its extreme positions, and finally to limit positively such movement.

Reversal of the force applied to lever 22 by the piston rod 23 is accomplished by reversing the flow of fluid under pressure to opposite ends of the cylinder 24 by way of conduits 25 connected to the cylinder ends. The ends of these conduits remote from the cylinder are connected to a four-way valve 26, also having a pressure fluid supply conduit 27 and a discharge conduit 28 connected to it. Fluid under pressure may be supplied to conduit 27 from a pressure tank 29. The fluid in such tank is kept under pressure by the pump or compressor 29'. It will be evident that the power system represented by the cylinder 24 and piston rod 23 may be of either the pneumatic or the hydraulic type. If the power actuator is air-operated, the pump 29' will be an air compressor, and the discharge conduit 28 may vent directly to the atmosphere. If this power system is of the hydraulic type the discharge pipe 28 will be connected to a suitable receiver from which the pump 29' will draw such liquid as may be required for operation of the power cylinder.

The direction in which the force is applied to the gate lever 22 by piston rod 23 can be reversed by swinging in one direction or the other the controlling handle 4 for valve 26. Such handle may be swung in one direction by energization of a solenoid 40, and returned in the opposite direction, upon deenergization of the solenoid, by a spring 41 stressed by the solenoid-effected movement of the handle. It will be evident that swinging of the valve handle effects corresponding movement of the lever 22, so that the power cylinder 24 merely constitutes a servo mechanism. If the solenoid 40 and spring 41 were sufficiently powerful, they could be connected directly to the lever 22 in lieu of the piston rod 23. The servo system including the power cylinder 24 is utilized, therefore, merely to enable the solenoid and spring to be of smaller capacity.

As long as an adequate and steady supply of material is available in the hopper 10 for discharge into the feed conduit 12 the gate 20 may remain in the broken line position illustrated, so that the fuel will pass through the delivery duct 13 into the furnace. When the supply of waste material is less than a predetermined amount for any appreciable period, however, the gate 20 should be swung into the solid line position illustrated, so that air will not be blown through duct 13 onto the fire in the upper portion of the furnace to cool it unnecessarily. With the gate in this position the material will all pass from the feed conduit 12 through return conduit 2 back into the hopper 10, and will continue to recirculate through it and conduits 12 and 2 until a sufficient additional supply of waste has been received from the plant through duct 1 to supply to the furnace a glow of fuel for a reasonable period of time at a concentration above the predetermined minimum.

Control of the gate movement to effect such operation of the system may be accomplished by a photoelectric material flow density, or material concentration, device operable to actuate suitable control mechanism capable of energizing and deenergizing the solenoid 40. Such material flow density device includes a light source 5 energized by an appropriate power supply 50. This light source is housed in a casing 51 on one side of and communicating with a control point in the feed conduit 12. Extending from the opposite side of the conduit at such point is a second casing 52 aligned with the casing 51 and housing a light-responsive or photoelectric cell or tube 53. Although such casings preferably extend from opposite sides of the conduit, they are shown in Figure 1 as projecting from top and bottom for simplicity of illustration, such figure being diagrammatic as mentioned previously. The photoelectric element 53 is connected in circuit with an amplifier 54 which regulates the flow of current through relays 6 and 60 from a power supply 55, 56, preferably of the 110 volt alternating current type, depending upon the intensity of the light projected onto the cell.

When the flow of material through conduit 12 is heavy, it will be evident that the photoelectric cell 53 is shielded to a greater extent from the light source 5 than it is when the flow is relatively light. The current passing from one of the power supply lines 56 through the amplifier 54 and wire 57 to the winding of relays 6 and 60 will increase as the light received by the photoelectric cell increases. These relays can therefore be selected or adjusted so that the switches 61 and 62 controlled by them, respectively, will be closed when the light acting on the photoelectric cell 53 has increased by the reduction of the flow through conduit 12 to a predetermined critical value.

The switches 61 and 62 control the energization of both solenoid 40 and a holding relay 63, the switch 64 of which is connected to the winding of relay 60 in parallel with the photoelectric cell amplifier 54. All the relays 6, 60 and 63 have switches of the normally open type, and relay 60 is of the delayed closing type while relay 6 is of the delayed opening type, having a suitable dashpot 65 and yieldable contact mounting 66, or equivalent mechanism, to delay opening of its switch 61 for a predetermined period after deenergization of its winding.

The function of the electrical control mechanism will be clarified by a description of the operation of the entire flow control system. Assuming first that a small amount of airborne material has been deposited in the hopper 10 from the conduit 1 after swinging of the gate 20 into the solid line position shown in Fig. 1, this material will be circulated by the blower 11 from the bottom of the hopper through conduit 12 and thence back through the return conduit 2 to the hopper. The resulting light flow of material between the light source 5 and the photoelectric cell 53 will constitute a negligible barrier to the passage of light to such cell. Consequently the resistance of the photoelectric controlled amplifier 54 will be small, and sufficient current will flow through the wire 57 to maintain relays 6 and 60 energized.

Since switches 61 and 62 of relays 6 and 60 will thus be held closed, the winding of relay 63 will be energized through them to hold switch 64 closed, which in turn will energize the alternate circuit to the winding of relay 60 bypassing amplifier 54. As long as both switches 61 and 62 remain closed, solenoid 40 will be energized to hold the handle 4 of valve 26 in the position shown, against the tension of spring 41. Consequently the pressure of the fluid in receiver 29 will be transmitted through conduit 27 and the conduit 25 thus connected to it, to maintain pressure on the upper side of the piston in the power cylinder 24. As long as the quantity of material circulating through the hopper 10, conduit 12, and return duct 2 remains small, therefore, the gate 20 will be held in its solid line position shown, to block passage of air and airborne material into the delivery duct 13.

If a considerable charge of material should be deposited into the hopper 10 from the supply conduit 11 it would immediately be drawn through feed duct 12, and for a moment the transmission of light from the source 5 to the photoelectric cell 53 would be blocked to a substantial degree. Nevertheless the amount of such a charge might well be so small that it would not be worth while swinging the gate 20 from its solid line position into its broken line position to deliver only such charge to the furnace through conduit 13.

When the light 5 is obscured momentarily by a heavy flow of material the resistance of amplifier 54 will immediately increase, thus reducing the flow of current through wire 57 and the winding of relay 6 sufficiently to release switch arm 61. Since this relay is of the normally open type, the switch will begin to open, but breaking of its circuit will be delayed for a substantial, predetermined period of time by the retarding action of dashpot 65 cooperating with the movable mounting 66 for the switch contact. Although relay 60 also is of the normally open type, its switch 62 will not open because of the connection to wire 56 through switch 64 of relay 63 in parallel with the photoelectric cell amplifier 54, which relay remains energized through the delayed opening switch 61. Consequently, despite deenergization of relay 6, relays 63 and 60 will remain energized for a short period, such as three to fifteen seconds, relay 60 holding switch 62 closed to maintain the solenoid 40 energized.

If, before switch 61 opens, the flow of material between light 5 and photoelectric cell 53 should decrease sufficiently to reenergize relay 6, its switch 61 will be swung to its extreme right position again to renew the time delay interval required for it to open, while relay 60 again will receive adequate current through amplifier 54. When a sufficient quantity of material has accumulated in the closed circuit through the hopper 10 to maintain a heavy flow of material between the light 5 and the photoelectric cell 53 for a length of time greater than the period during which opening of switch 61 is delayed by the dashpot 65 and contact mounting 66, solenoid 40 will not remain energized. The delayed opening switch 61 not only is in direct circuit with the solenoid, but also controls the energization of relay 63. When its winding is deenergized by opening of this switch its switch 64 will open, to deenergize relay 60 so that its switch 62 will be released.

When the magnetic force created by the solenoid 40 ceases, spring 41 will swing the valve control handle 4 into the broken line position shown, to reverse four-way valve 26. The fluid under pressure in receiver 29 will then flow through conduit 27 into the pipe 25 communicating with the end of cylinder 4 beneath its piston, and the upper end of this cylinder will be vented through the other pipe 25. The force thus applied to the piston will swing lever 22 and gate 20 into the broken line position shown in the drawings, although such movement will be damped by the action of the dashpot 3, as previously explained, which finally will arrest movement of the gate when it has reached its broken line position.

As soon as the gate has been swung into a position blocking return conduit 2 and opening delivery conduit 13 in the manner described, the airborne material driven by blower 11 will be forced through the delivery conduit into the furnace. The operation of the system will be stabilized under these conditions as long as the material collected in the hopper 10 and that entering it through supply conduit 1 maintain a flow through feed conduit 12 sufficiently heavy to obscure the light 5 from the photoelectric cell 53 and maintain relays 6 and 60 deenergized.

If the material stored in hopper 10 should be exhausted and momentarily the supply of additional material to it through conduit 1 should fall below a predetermined value, the illumination of photoelectric cell 53 by the light source 5 may be sufficient to decrease the resistance in amplifier 54 and increase the current flow through wire 57 enough to energize relays 6 and 60. Despite the immediate closing of switch 61, since the dashpot 65 does not produce any force retarding closing of its switch, accomplished by such energization of relay 6, solenoid 40 will not be energized immediately because relay 60 is of the delayed action type, postponing for perhaps three to fifteen seconds closing of its switch 62, which is in series with solenoid 40 and switch 61 of relay 6. As long as switch 62 remains open, therefore, solenoid 40 cannot be energized, and consequently spring 41 will hold the control valve 26 in position to retain the gate 20 in its broken line position.

If the quantity of material supplied to the hopper 10 and feed duct 12 should be interrupted or depleted for only a brief interval, the passage of light from source 5 to photoelectric cell 53 again will be substantially interrupted, sufficiently to deenergize relay 6. Relay 60 also will be deenergized if such reduction in current flow through wire 57 has not persisted for a length of time sufficient to close its switch 62, because relay 63 does not become energized until such switch is closed. Such deenergization of relay 60 will release switch 62, so that the switch-closing action of such relay must be started again when the flow of material past the control point of conduit 12 again is depleted.

It will be evident, therefore, that my control mechanism effects a stable control action of gate 20. Brief irregularities in the flow conditions of material through feed conduit 12 past the control point, whether increase or decrease, will not actuate the control mechanism to shift the gate, but, on the contrary, a change in flow density of the material above or below a critical value for which light source 5 and photoelectric cell 53 are set must be sustained for respective periods predetermined by the characteristics of relays 6 and 60 before the gate will be swung from one control position to the other in response to the altered material flow conditions.

An alternate circuit diagram for the control mechanism is shown in Fig. 2, by which energization of the solenoid 40 is controlled in response to variations in the intensity of light projected on the photoelectric cell 53. In this circuit two relays 7 and 70, incorporating delayed movement switch arms like relay 60, are employed, but in this instance both relay switches 71 and 72 are of the normally closed type instead of being normally open. Also this circuit includes a relay 73 which, in effect, is a power relay, enabling a heavier current to be used in the solenoid circuit than that which passes through the control relay mechanism. Thus switch 74 of this relay effects energization of solenoid 40, but, alternatively, this solenoid might be directly in circuit with switch 72 of solenoid 70, to be energized by closing of such switch.

The solenoids 7 and 70 are illustrated diagrammatically as being of the delayed arm moving type, as mentioned above, it being understood that these relay mechanisms may incorporate bimetallic switch arms which may be resistance heated, or rotary timing mechanism of any conventional type. The winding of relay 7 is in series with amplifier 54 of the photoelectric cell 53, and the winding of relay 70 is in series circuit with switch 71 of relay 7. By energization of relay 7, therefore, its switch 71 will be opened to deenergize relay 70 so that its switch 72 will close. On the contrary, whenever the flow of current through amplifier 54 drops sufficiently to effect deenergization of relay 7, its switch 71 will close to energize relay 70, which in turn will open its switch 72, thus interrupting the current through the gate-controlled solenoid 40, either directly or by deenergization of relay 73. Such operation occurs whether or not relays 7 and 70 are of the delayed action type.

If the movement of switch arms 71 and 72 to open their switches is delayed when their respective relay windings are energized, it will be evident that with the solenoid 40 deenergized the reduction in material flow through the feed conduit 12 must be sustained for a predetermined period to maintain the winding of relay 7 energized long enough to open its switch 71 before the winding of relay 70 will be deenergized, enabling switch 72 to close for energizing solenoid 40. Alternatively, when relay 7 is deenergized in response to resumption of an adequate flow of material through conduit 12, the resultant energization of the winding of relay 70 will not open switch 72 immediately, and consequently the solenoid 40 will remain energized for a continued period, depending upon the time delay characteristics of relay 70.

Shifting of gate 20 from its broken line position to its solid line position cuts off flow into delivery conduit 13 both of the small amount of material passing through the blower and of the air supplied by it. This gate, however, does not merely block flow of material from the feed duct into the delivery duct, but opens the alternative passage through return duct 2. Consequently, despite interruption of the delivery flow, there is no danger of the conduit system becoming clogged upon a sudden supply of a considerable amount of material through duct 1, even though corrective action of the control mechanism is delayed in the manner described, because such material will merely be recirculated by the blower through return duct 2, the hopper 10 and feed duct 12. In case the electric mechanism should fail, the solenoid 40 would be deenergized and the gate would stay in or move to its broken line position. If the power mechanism should cease to function for any reason when the gate is in its solid line position, so that it could not swing the gate to its broken line position, a considerable quantity of material can accumulate in the circulating orbit before danger of the system clogging arises, depending on the capacity of hopper 10. Before that occurs the failure will undoubtedly be noticed and gate 20 swung manually into its broken line position to release the material for flow through the delivery duct 13, in which position it may be left until the power mechanism has been repaired.

I claim as my invention:

1. Control mechanism for a material handling system having a feed conduit, a delivery conduit, and a continuously operating blower forcing material from the feed conduit toward the delivery conduit, comprising a return conduit communicating between the delivery conduit and the feed conduit, a gate movable between a position blocking the delivery conduit and a position blocking said return conduit, and gate controlling mechanism including means responsive to flow of material through the feed conduit, operable to effect swinging of said gate from its return conduit blocking position to its delivery conduit blocking position upon reduction in the density of material flow below a predetermined value.

2. Control mechanism for a material handling system having a feed conduit, a delivery conduit, and a continuously operating blower forcing material from the feed conduit toward the delivery conduit, comprising a return conduit communicating between the delivery conduit and the feed conduit, a gate movable between a position blocking the delivery conduit and a position blocking said return conduit, and gate controlling mechanism including means responsive to flow of material through the feed conduit, operable to effect swinging of said gate from its return conduit blocking position to its delivery conduit blocking position upon reduction in the density of material flow below a predetermined value, and means operable to effect energization of said flow responsive means to effect such gate swinging only after such reduced density flow conditions have persisted for longer than a predetermined period of time.

3. Control mechanism for a material handling system having a feed conduit, a delivery conduit, and a continuously operating blower forcing material from the feed conduit toward the delivery conduit, comprising a return conduit communicating between the delivery conduit and the feed conduit, a gate movable between a position blocking the delivery conduit and a position blocking said return conduit, and gate controlling mechanism including means responsive to flow of material through the feed conduit, operable to effect swinging of said gate from its return conduit blocking position to its delivery conduit blocking position upon reduction in the density of material flow below a predetermined value, and further operable to effect swinging of said gate from its delivery conduit blocking position into its return conduit blocking position upon increase in the quantity of material flowing through the feed conduit to a flow density above a predetermined value.

4. Control mechanism for a material handling system having a feed conduit, a delivery conduit, and a continuously operating blower forcing material from the feed conduit toward the delivery conduit, comprising a return conduit communicating between the delivery conduit and the feed conduit, a gate movable between a position blocking the delivery conduit and a position blocking said return conduit, and gate controlling mechanism including means responsive to flow of material through the feed conduit, operable to effect swinging of said gate from its return conduit blocking position to its delivery conduit blocking position upon reduction in the density of material flow below a predetermined value, means operable to effect energization of said flow responsive means to effect such gate swinging only after such reduced density flow conditions have persisted for longer than a predetermined period of time, and means operable to effect swinging of said gate from its delivery conduit blocking position into its return conduit blocking position upon increase in the quantity of material flowing through the feed conduit to a flow density above a predetermined value which persists for longer than a predetermined period of time.

5. A material handling system comprising a delivery conduit, a return conduit, a feed conduit operable to communicate alternatively with said delivery conduit and with said return conduit, a blower operable to force airborne material from the feed conduit toward said delivery conduit and said return conduit, flow controlling means operable to divert flow of airborne material from said delivery conduit to said return conduit, and control means operable automatically in response to reduction in flow of airborne material through said feed conduit and said delivery conduit below a predetermined value to actuate said flow controlling means for diverting the flow of such material from said delivery conduit into said return conduit.

6. A material handling system comprising a delivery conduit, a return conduit, a feed conduit operable to communicate alternatively with said delivery conduit and with said return conduit, a blower operable to force airborne material from the feed conduit toward said delivery conduit and said return conduit, gate means operable to interrupt flow of airborne material into said delivery conduit and to open said return conduit for flow of such material into it, and photoelectric control means operable in response to reduction in flow of airborne material through said feed conduit below a predetermined value to move said gate means for blocking the flow of such material into said delivery conduit and opening said return conduit to receive such material.

7. Control mechanism for a material handling system having a feed conduit, a delivery conduit, and a continuously operating blower forcing material from the feed conduit toward the delivery conduit, comprising a return conduit communicating between said delivery conduit and the feed conduit, a hinged gate swingable between a position blocking the delivery conduit and a position blocking said return conduit, a light source illuminating a control point in the feed conduit, a photoelectric cell operable to receive light from said light source passing through such control point in the feed conduit, and electric control mechanism operable in response to shielding of said photoelectric cell from light by flow of material through the feed conduit and past such control point at a density higher than a predetermined value, to effect swinging of said gate from its delivery conduit blocking position into its return conduit blocking position, and further operable in response to illumination of said photoelectric cell by said light source upon decrease in density of material flow through the feed conduit past the control point below a predetermined value to effect swinging of said gate from its return conduit blocking position into its delivery conduit blocking position.

8. Control mechanism for a material handling system having a feed conduit, a delivery conduit, and a continuously operating blower forcing material from the feed conduit toward the delivery conduit, comprising a return conduit communicating between said delivery conduit and the feed conduit, a hinged gate swingable between a position blocking the delivery conduit and a position blocking said return conduit, fluid-operated gate actuating means operable to swing said gate between such positions, a light source illuminating a control point in the feed conduit, a photoelectric cell operable to receive light from said light source passing through such control point in the feed conduit, and electric control mechanism operable in response to shielding of said photoelectric cell from light by flow of material through the feed conduit and past such control point at a density higher than a predetermined value, to effect operation of said fluid-operated gate actuating mechanism to swing said gate from its delivery conduit blocking position into its return conduit blocking position, and further operable in response to illumination of said photoelectric cell by said light source upon decrease in density of material flow through the feed conduit past the control point below a predetermined value to effect operation of said fluid-operated gate actuating means to swing said gate from its return conduit blocking position into its delivery conduit blocking position.

9. Control mechanism for a material handling system having a feed conduit, a delivery conduit, and a continuously operating blower forcing material from the feed conduit toward the delivery conduit, comprising a return conduit communicating between said delivery conduit and the feed conduit, a hinged gate swingable between a position blocking the delivery conduit and a position blocking said return conduit, fluid-operated gate actuating means operable to swing said gate between such positions, dashpot mechanism operable to snub swinging of said gate from one position into the other, a light source illuminating a control point in the feed conduit, a photoelectric cell operable to receive light from said light source passing through such control point in the feed conduit, and electric control mechanism operable in response to shielding of said photoelectric cell from light by flow of material through the feed conduit and past such control point at a density higher than a predetermined value, to effect operation of said fluid-operated gate actuating mechanism to swing said gate from its delivery conduit blocking position into its return conduit blocking position, and further operable in response to illumination of said photoelectric cell by said light source upon decrease in density of material flow through the feed conduit past the control point below a predetermined value to effect operation of said fluid-operated gate actuating means to swing said gate from its return conduit blocking position into its delivery conduit blocking position.

10. Control mechanism for a material handling system having a feed conduit, a delivery conduit, and a continuously operating blower forcing material from the feed conduit toward the delivery conduit, comprising a return conduit communicating between said delivery conduit and the feed conduit, a hinged gate swingable between a position blocking the delivery conduit and a position blocking said return conduit, gate actuating means operable to swing said gate between such positions, a light source illuminating a control point in the feed conduit, a photoelectric cell operable to receive light from said light source passing through such control point in the feed conduit, and electric control mechanism operable in response to shielding of said photoelectric cell from light by flow of material through the feed conduit and past such control point at a density higher than a predetermined value to effect operation of said gate actuating mechanism to swing said gate from its delivery conduit blocking position into its return blocking position, and further operable in response to illumination of said photoelectric cell by said light source upon decrease in density of material flow through the feed conduit past the control point below a predetermined value to effect operation of said gate actuating means to swing said gate from its return conduit blocking position into its delivery conduit blocking position, said electric control mechanism including means operable to delay gate swinging operation of said gate actuating mechanism to swing the gate from its delivery conduit blocking position to its return conduit blocking position until the flow of material past the control point at a density higher than the predetermined value has persisted for longer than a predetermined period of time.

11. Control mechanism for a material handling system having a feed conduit, a delivery conduit, and a continuously operating blower forcing material from the feed conduit toward the delivery conduit, comprising a return conduit communicating between said delivery conduit and the feed conduit, a hinged gate swingable between a position blocking the delivery conduit and a position blocking said return conduit, gate actuating means operable to swing said gate between such positions, a light source illuminating a control point in the feed conduit, a photoelectric cell operable to receive light from said light source passing through such control point in the feed conduit, and electric control mechanism operable in response to shielding of said photoelectric cell from light by flow of material through the feed conduit and past such control point at a density higher than a predetermined value to effect operation of said gate actuating mechanism to swing said gate from its delivery conduit blocking position into its return conduit blocking position, and further operable in response to illumination of said photoelectric cell by said light source upon decrease in density of material flow through the feed conduit past the control point below a predetermined value to effect operation of said gate actuating means to swing said gate from its return conduit blocking position into its delivery conduit blocking position, said electric control mechanism including means operable to delay gate swinging operation of said gate actuating mechanism to swing the gate from its delivery conduit blocking position to its return conduit blocking position until the flow of material past the control point at a density higher than the predetermined value has persisted for longer than a predetermined period of time, and to delay gate swinging operation of said gate actuating mechanism to swing the gate from its return conduit blocking position to its delivery conduit blocking position until the flow of material past the control point at a density lower than a predetermined value has persisted for longer than a predetermined period of time.

12. An airborne fuel handling system or the like, comprising an accumulator duct providing a closed circuit flow path for such airborne fuel, a supply duct for introducing fuel into said accumulator duct at random and independently of quantity of fuel therein, a delivery duct communicating with said accumulator duct at a location enabling it to carry off airborne fuel from the latter, a blower operable to maintain circulation of fuel in airborne condition in said accumulator duct and movement toward the entrance opening of said delivery duct, gate means operable to control the entrance opening to said delivery duct, and photoelectric control means responsive to increase in density of airborne fuel circulating around the closed circuit defined by said accumulator duct above a predetermined value automatically to open said gate means and establish communication of said delivery duct with said accumulator duct.

13. A material handling system comprising an accumulator, duct means operable to introduce comminuted material into said accumulator, delivery duct means operable to withdraw comminuted material from said accumulator, blower means connected to blow air through said accumulator and maintain comminuted material in said accumulator in airborne suspension therein and alternatively to blow air into said delivery duct means and force material in suspension from said accumulator into said delivery duct means, and control means operable to enable flow of the fuel in airborne suspension into said delivery duct means in response to increase in density of the airborne material in said accumulator above a predetermined value.

14. A material handling system comprising an accumulator, duct means operable to introduce comminuted material into said accumulator, delivery duct means operable to withdraw comminuted material from said accumulator, blower means connected to blow air through said accumulator and maintain comminuted material in said accumulator in airborne suspension therein and alternatively to blow air into said delivery duct means and force material in suspension from said accumulator into said delivery duct means, and control means responsive to reduction in airborne-material density below a predetermined value, operable to obstruct the flow of fuel in airborne suspension into said delivery duct means.

JOE BARBEE McFALL.

REFERENCES CITED

The following references are of record in the file of this patent:

UNITED STATES PATENTS

| Number | Name | Date |
|---|---|---|
| 572,492 | Morton | Dec. 1, 1896 |
| 765,657 | Arnault | July 26, 1904 |
| 1,191,072 | Fessenden | July 11, 1916 |
| 1,365,663 | Covert | Jan. 18, 1921 |